United States Patent [19]
Vartti et al.

[11] Patent Number: 5,574,753
[45] Date of Patent: Nov. 12, 1996

[54] GLITCH FREE CLOCK START/STOP CONTROL CIRCUIT FOR OUTPUTTING A SINGLE CLOCK SIGNAL AND A SINGLE SYNC SIGNAL FROM A PLURALITY OF SYNC SIGNAL INPUTS AND A PLURALITY OF CLOCK SIGNAL INPUTS

[75] Inventors: Kelvin S. Vartti, Vadnais Heights; Thomas T. Kubista, Eagan, both of Minn.; Ferris T. Price, deceased, late of Mayer, Minn., by Robert Howe Price, Personal Representative

[73] Assignee: Unisys Corporation, Blue Bell, Pa.

[21] Appl. No.: 180,896

[22] Filed: Jan. 12, 1994

Related U.S. Application Data

[63] Continuation-in-part of Ser. No. 172,661, Dec. 23, 1993, Pat. No. 5,422,915.

[51] Int. Cl.⁶ .................................................. H04L 7/00
[52] U.S. Cl. ................ 375/357; 370/100.1; 327/144; 327/298; 375/369; 375/374
[58] Field of Search ................................ 375/354, 357, 375/360, 355, 356, 358, 362, 363, 369, 371; 327/34, 99, 144, 145, 176, 292, 298; 331/49, 55, 56; 370/100.1

[56] References Cited

U.S. PATENT DOCUMENTS

| | | | |
|---|---|---|---|
| 3,940,558 | 2/1976 | Gabbard et al. | 375/357 |
| 4,254,492 | 3/1981 | McDermott, III | 375/357 |
| 4,412,342 | 10/1983 | Khan et al. | 375/356 |
| 4,419,629 | 12/1993 | O'Brien | 327/99 |
| 4,538,272 | 8/1985 | Edwards et al. | 375/357 |
| 4,644,498 | 2/1987 | Bedard et al. | 395/182.01 |
| 4,707,142 | 11/1987 | Baker et al. | 368/46 |
| 4,754,164 | 6/1988 | Flora et al. | 327/152 |
| 4,882,738 | 11/1989 | Suzuki | 375/357 |
| 4,965,524 | 10/1990 | Datchen | 327/99 |
| 4,970,405 | 11/1990 | Hagiwara | 327/145 |
| 5,256,912 | 10/1993 | Rios | 327/144 |
| 5,291,528 | 3/1994 | Vermeer | 375/354 |
| 5,317,601 | 5/1994 | Riordan et al. | 375/356 |
| 5,422,915 | 6/1995 | Byers et al. | 375/357 |

FOREIGN PATENT DOCUMENTS 0242010  1/1987  United Kingdom.

Primary Examiner—Young T. Tse
Assistant Examiner—William Luther
Attorney, Agent, or Firm—Nawrocki, Rooney & Sivertson, P.A.

[57] ABSTRACT

A glitch free clock switching circuit which produces a predictable and specifiable number of clock pulses to the system elements when switching between clock signals, even during full operation. In addition, the present invention has the capability of only switching between clocks at times that coincides with every Nth clock cycle. This is important in various types of computers systems including high reliability systems because it results in a clock switching circuit which can provide a clock signal which remains consistent throughout the computer system even in light of multiple hardware failures.

14 Claims, 6 Drawing Sheets

GLITCH FREE CLOCK START/STOP CONTROL CIRCUIT FOR OUTPUTTING A SINGLE CLOCK SIGNAL AND A SINGLE SYNC SIGNAL FROM A PLURALITY OF SYNC SIGNAL INPUTS AND A PLURALITY OF CLOCK SIGNAL INPUTS

CROSS REFERENCE TO CO-PENDING APPLICATION

This is a continuation-in-part of commonly assigned application Ser. No. 08/172,661, filed Dec. 23, 1993, and entitled, "FAULT TOLERANT CLOCK DISTRIBUTION SYSTEM", now U.S. Pat. No. 5,422,915.

BACKGROUND OF THE INVENTION

1. Field of the Invention

The present invention generally relates to clock distribution systems, and more particularly to a clock distribution system which utilizes multiple clock sourcing circuitry to simultaneously clock a plurality of circuit loads.

2. Description of the Prior Art

Modern digital circuitry requires the use of a synchronous clock to provide timing for the computational and control functions. It is this synchronization which renders the digital sequential machine capable of theoretically absolute repeatability. These synchronous systems are digital systems wherein the operations are controlled by continuous, periodic clock pulses. This allows activity within the system to occur at a fixed time relative to the pulses of the synchronous clock.

Synchronous computer systems also use a number of different memory elements. These memory elements are typically synchronous and therefore require the clock signal. In addition, these memory elements can be "edge triggered" which means that new data is stored in the memory element on a particular edge of the clock (for example on the low to high transition). If a digital circuit that contains synchronous memory elements loses the clock signal, the circuit will cease to function. In addition, if there is a "glitch" on the clock line (a glitch being defined as an undesired spike of voltage) the synchronous memory elements may load erroneous data because typically they are edge triggered and the glitch will be interpreted as an "edge". Therefore, it is vital to any digital system to have a reliable and glitch free clock signal.

In electronic circuitry requiring digital synchronous clock signals, reliability concerns often dictate the use identical redundant clock signals within a given system. The purpose of the redundant clock signals is to provide a substitute clock signal should the primary clock signal fail. The problem presented with multiple redundant clock sources is the need to switch between them to preserve system operation following failure of the main clock source. Typically, a voting method is used to generate the primary clock signal. An example of such a circuit is discussed in U.S. Pat. No. 4,644,498, issued to Bedard et al. This type of circuit simply has an odd number of identical clock sourcing circuits so that the failure of a minority of the clock sourcing circuits will not cause the entire system to fail. Therefore, this type of circuit does not really switch between clock signals but rather it generates a new signal based on the voting scheme.

The major problem with the voting approach is that the complex circuitry required to implement the voting process may provide an actual decrease in reliability when measured at the system level. This occurs because, though this approach provides protection against failure of a clock source, it adds the voting circuitry as a critical element. Therefore, a failure of the voting circuit can disable the system even though failures of an individual clock source do not. Oftentimes, the reliability of the voting circuit is less than that of an individual clock source, thus decreasing overall system reliability.

In addition to reliability concerns, it may also be necessary to switch between different clock sources during mode changes in normal operation. It is known, for example, to have different frequency clock signals within a given system. Typically, a given element within a system will only use one of a plurality of different frequency clock signals. Therefore, no clock switching is required for that element. However, some applications require that a given element within a system run with various frequency clock signals at different times or in different modes. An example of this would be a microprocessor which has a functional mode and a self test mode. Typically the microprocessor will run using a functional clock in functional mode and using a test clock in test mode. The frequency of the functional clock will typically be much higher than that of the test clock. Though undesirable, the switch between such a functional clock and a test clock can be accomplished by disabling the operation of the system during the switching process.

SUMMARY OF THE INVENTION

The present invention overcomes the disadvantages found in the prior art by providing a synchronous glitch free clock switching circuit which produces a predictable and specifiable number of clock pulses to the system elements when switching between clock signals, even during full operation. In addition, the present invention has the capability of only switching between clocks at times that coincides with every Nth clock cycle. This is important in various types of computers systems including high reliability systems because it results in a clock switching circuit which can provide a clock signal which remains consistent throughout the computer system even in light of multiple hardware failures.

The system incorporating the preferred mode of the present invention requires that there be a plurality of clock switching circuits throughout the system. Each clock switching circuit provides a clock signal for one "element" within the system. With many past clock switching circuits these would not be synchronously timed with the system to permit each element to operate at its own rate. That is, the clock switching circuitry would not be synchronized with a periodic switching signal (like a "sync" signal). Therefore with this approach, it is impossible to predict how may clock pulses are actually transmitted to the memory devices before the first clock pulse is disabled. Similarly, it would be impossible to predict how many clock pulses are actually transmitted when the second clock is enabled. The number of pulses is entirely dependent on when in time the clock select signal arrives at the clock switching circuitry.

In the present system, each clock switching circuit drives one "element" within the system. In order to maintain data integrity, it is essential that each element receive the same number of clock pulses. This is true because if a first element receives an extra pulse, the data in the memory within that first element would be transmitted to a second element; but the second element would not be receiving such data because it would not receive the additional clock pulse.

Therefore, the data contained in the memory of the first element would be lost. This could result in catastrophic consequences for system operation.

In the present system, it is also important that the clock signal only be switched at a given multiple of clock pulses. For example, the clock signal should only be switched at a time that coincides with every Nth clock cycle (where N is an integer greater than or equal to one). This is important in pipelined system architectures which require a given number of clock pulses to "clear the pipeline" and get prepared for the next instruction. Although this is important in the described system, it should in no limit the scope of the present invention to "pipelined" systems or to the requirement that the clock be switched at a time that coincides with every Nth clock cycle.

In the preferred mode the present invention is used in a fault tolerant clock distribution system which utilizes redundant circuit loads each powered by separate voltage sources, so that the failure of a voltage source does not result in the loss of the system data. In order to accomplish a redundant circuit load system, a circuit load and its clock sourcing and synchronizing circuity must be powered by a voltage source which is isolated from the redundant circuit load, clock sourcing circuitry, and synchronizing circuitry. Therefore, a separate clock signal in each "power domain" must clock its associated circuit load so that the loss of the voltage source, the synchronizing circuitry, or the circuit load will not result in the loss of system data. (A "power domain" refers to the area driven by the same voltage source and voltage bus). These two separate clock signals also need to be synchronized with one another across the power domain boundary so that each circuit load is clocked at precisely the same time in order to maintain the same data or perform the same function in each of the two circuit loads. The present system provides redundant clock sourcing circuits, each of which are powered by separate voltage sources, in order to simultaneously clock multiple circuit loads which are also powered by separate voltage sources. The present invention provides the clock switching mechanism for switching between the redundant clocks. This allows continued system performance in the event of a clock source failure or a circuit load failure.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
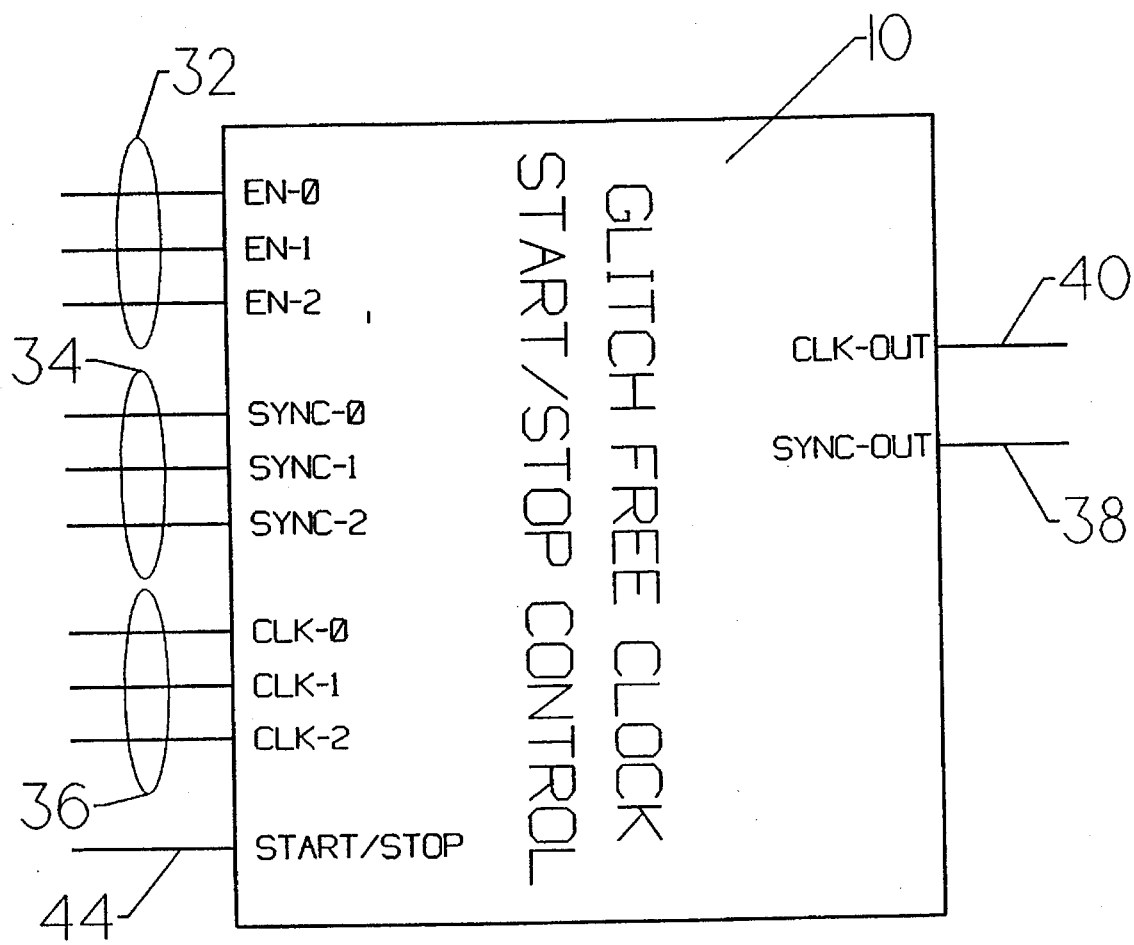
FIG. 1 is a block diagram of the glitch free clock switching circuit.

FIG. 1 is a block diagram of the glitch free clock switching circuit 10, employing the preferred mode of the present invention. It consists of a circuit having enable ports 32, sync ports 34, clock ports 36, start/stop port 44, clk-out port 40, and sync-out port 38. The clock ports 36 are the electrical interface between the various clock sources used in a digital system with the clock switching circuitry. The sync ports 34 are the electrical interface between the various sync signals used in a digital system and the clock switching circuitry. The clock signals and the sync signals come in pairs and therefore each clock signal has a particular sync signal associated with it. The sync signal contains a pulse for every eight clock pulses. The sync pulse being the same width as any given clock period. Although the preferred embodiment contains a sync pulse for every eight clock pulses, this invention is in no way limited to this relationship. One skilled in the art will recognize that any ratio of sync pulses to clock pulses can be used in the present invention. The enable ports 32 provide the electrical interface between the clock enable signals used in the digital system and the clock switching circuitry. The enable signals select between the plurality of sync and clock signal pairs employed in a given digital system. The start/stop port 44 is the electrical interface between the start/stop signal provided by the digital system and the clock switching circuitry. The start/stop signal is used to initiate a clock switching cycle. The clock-out port 40 is the electrical interface between the clock-out signal and a digital system. The clock-out signal is one of the outputs of the clock switching circuit. The sync-out port 38 is the electrical interface between the sync-out signal and a digital system. The sync-out signal is one of the outputs of the clock switching circuit.

Figure 2:
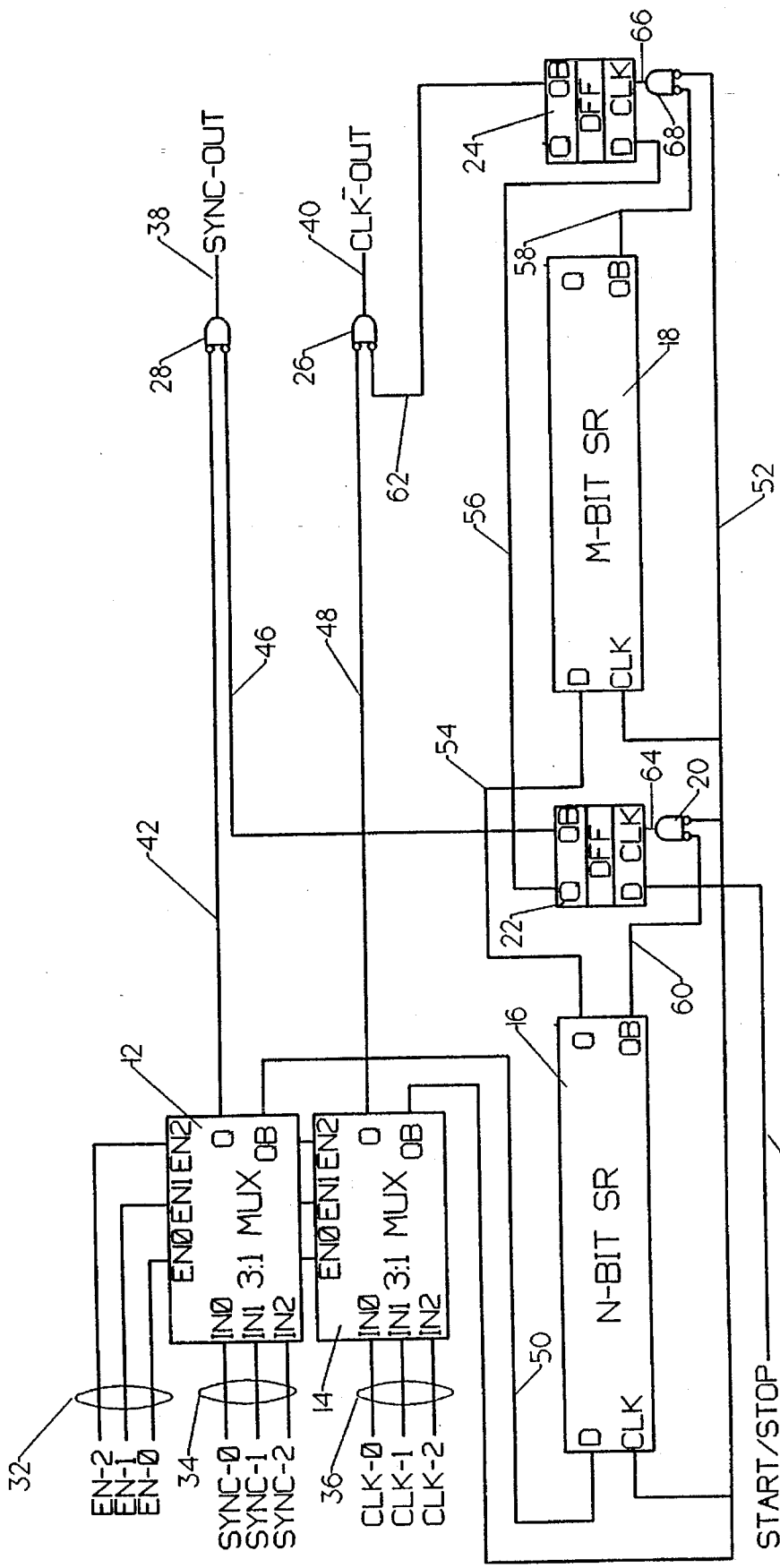
FIG. 2 is a detailed block diagram of the glitch free clock switching circuit shown in FIG. 1.

FIG. 2 is a detailed block diagram of showing the functional operations performed by the glitch free clock switching circuit 10, shown in FIG. 1.

The 3:1 MUX 14 is a three to one multiplexer with inverting (Q) and non-inverting (QB) outputs. The preferred embodiment of 3:1 MUX 14 is further illustrated in FIG. 6. The 3:1 MUX 14 selects between the three clock ports 36 using the enable signals contained on enable ports 32. The resulting signal called sel-clk is placed on wire 48. The inverse logic state is placed on wire 52 and is called sel-clkb. Although the preferred embodiment only contains three clock ports, this invention is not limited to this number. One skilled in the art would recognize that the 3:1 MUX 14 could be replaced with a N:1 MUX (where N is greater than or equal to 1) and therefore could accommodate N clock ports 36.

Similarly, 3:1 MUX 12 is a three to one multiplexer with inverting (Q) and non-inverting (QB) outputs. The preferred embodiment of 3:1 MUX 12 is also described in detail in FIG. 6. The 3:1 MUX 12 selects between the three sync ports 34 using the enable signals contained on enable ports 32. The resulting signal called sel-sync is placed on wire 42. The inverse logic state is placed on wire 50 and is called sel-syncb. Although the preferred embodiment only contains three sync ports, this invention is not limited to this number. One skilled in the art would recognize that the 3:1 MUX 12 could be replaced with a N:1 MUX (where N is greater than or equal to 1) and therefore could accommodate N sync ports 34.

N-Bit shift register 16 is an N-bit wide (where N is greater than or equal to 1) standard positive edge triggered shift register with true (Q) and complement (QB) output ports. The data-in port of N-Bit Shift Register 16 is coupled to the QB output port of 3:1 MUX 12 via wire 50. The clock input of N-Bit Shift Register 16 is coupled to the QB output port of 3:1 MUX 14 via wire 52.

M-Bit shift register 16 is a M-bit wide (where M is greater than or equal to 1) Standard positive edge triggered shift register with true and complement output ports. The Q output port if N-Bit Shift Register 16 is coupled to the data-in port of M-Bit Shift Register 18 via wire 54. The clock input of M-Bit Shift Register 18 is coupled to the QB output port of 3:1 MUX 14 via wire 52. Note that both N-Bit Shift Register 16 and M-Bit Shift Register 18 have the QB output of 3:1 MUX 14 driving their clock input inputs via wire 52.

DFF 22 is a standard positive edge triggered D type flip flop with true (Q) and complement (QB) outputs. The data-in port of DFF 22 is coupled to start/stop port 44. The clock input of DFF 22 is coupled to the output port of and-gate 20 via wire 64. The first input port of and-gate 20 is connected to the QB output port of 3:1 MUX 14 via wire 52. The second input port of and-gate 20 is connected to the QB output port of N-Bit Register 16 via wire 60. And-gate 20 is a two input and-gate with inverting inputs.

DFF 24 is a standard positive edge triggered D type flip flop with true (Q) and complement (QB) outputs. The data-in port of DFF 24 is coupled to the Q output of DFF 22 via Wire 56. The clock input of DFF 24 is coupled to the output port of and-gate 68 via wire 66. The first input port of and-gate 68 is connected to the QB output port of 3:1 MUX 14 via wire 52. The second input port of and-gate 68 is connected to the QB output port of M-Bit Register 18 via wire 58. And-gate 68 is a two input and-gate with inverting inputs.

And-gate 28 is also a two input and-gate with inverting inputs. The output port of and-gate 28 is coupled to sync-out port 38. The first input port of and-gate 28 is coupled to the Q port of 3:1 MUX 12 via wire 42. The second input port of and-gate 28 is coupled to the QB port of DFF 22 via wire 46.

And-gate 26 is also a two input and-gate with inverting inputs. The output port of and-gate 26 is coupled to clk-out port 40. The first input port of and-gate 26 is coupled to the Q port of 3:1 MUX 14 via wire 48. The second input port of and-gate 26 is coupled to the QB port of DFF 24 via wire 62.

The operation of the circuitry of FIG. 2 to perform the desired glitch-free switching between the three clock input signals is apparent from the detailed description below.

Figure 3:
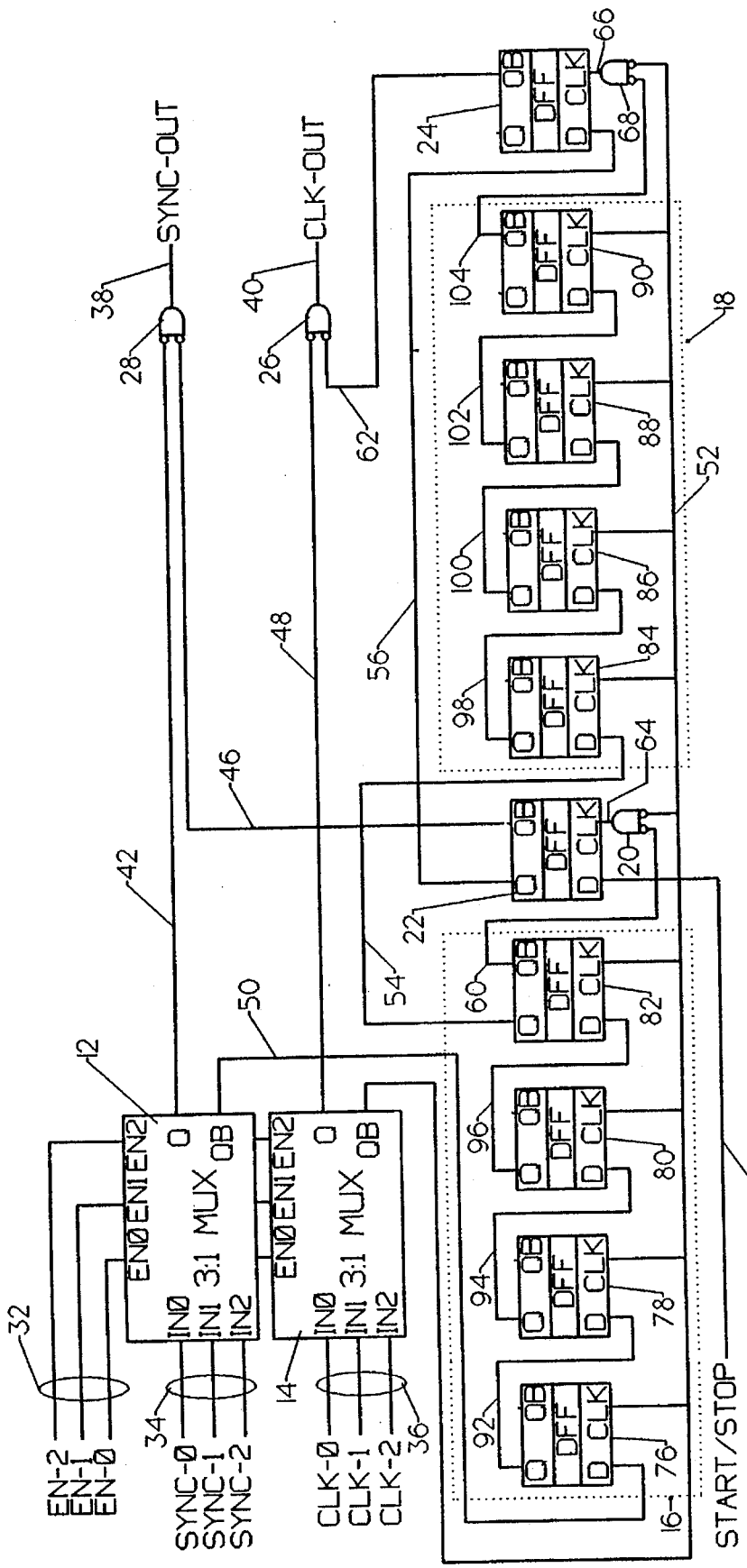
FIG. 3 is a detailed block diagram of the preferred embodiment of the invention.

FIG. 3 is a detailed block diagram of the preferred embodiment of the invention (see also FIG. 1 and FIG. 2). The preferred embodiment is a particular example of the present invention described above in the general case.

The N-Bit Shift Register 16 is comprised of four D-type flip flops 76, 78, 80 and 82. The data-in port of DFF 76 is equivalent to the data-in port of N-Bit Shift Register 16 and is coupled to the QB output port of 3:1 MUX 12. The Q output port of DFF 76 is coupled to the data-in port of DFF 78. The Q output port of DFF 78 is coupled to the data-in port of DFF 80. The Q output port of DFF 80 is coupled to the data-in port of DFF 82. The Q and QB output ports of DFF 82 are equivalent to the Q and QB ports of N-Bit Shift Register 16. The clock input ports of DFF's 76, 78, 80 and 82 are all coupled to the clock input port of N-Bit Shift Register 16 and are also coupled to the QB output port of 3:1 MUX 14.

The M-Bit Shift Register 18 is comprised of four D-type flip flops 84, 86, 88 and 90. The data-in port of DFF 84 is equivalent to the data-in port of M-Bit Shift Register 18 and is coupled to the Q output port of DFF 82 via wire 54. The Q output port of DFF 84 is coupled to the data-in port of DFF 86. The Q output port of DFF 86 is coupled to the data-in port of DFF 88. The Q output port of DFF 88 is coupled to the data-in port of DFF 90. The Q and QB output ports of DFF 90 are equivalent to the Q and QB ports of M-Bit Shift Register 18. The clock input ports of DFF's 84, 86, 88 and 90 are all coupled to the clock input port of M-Bit Shift Register 18 and are also coupled to the QB output port of 3:1 MUX 14.

The operation of this preferred embodiment is identical to the more general case presented in FIG. 2 for N and M equal to four. That is, the preferred mode employs four-bit shift registers for N-bit Shift Register 16 and M-bit Shift Register 18.

Figure 4:
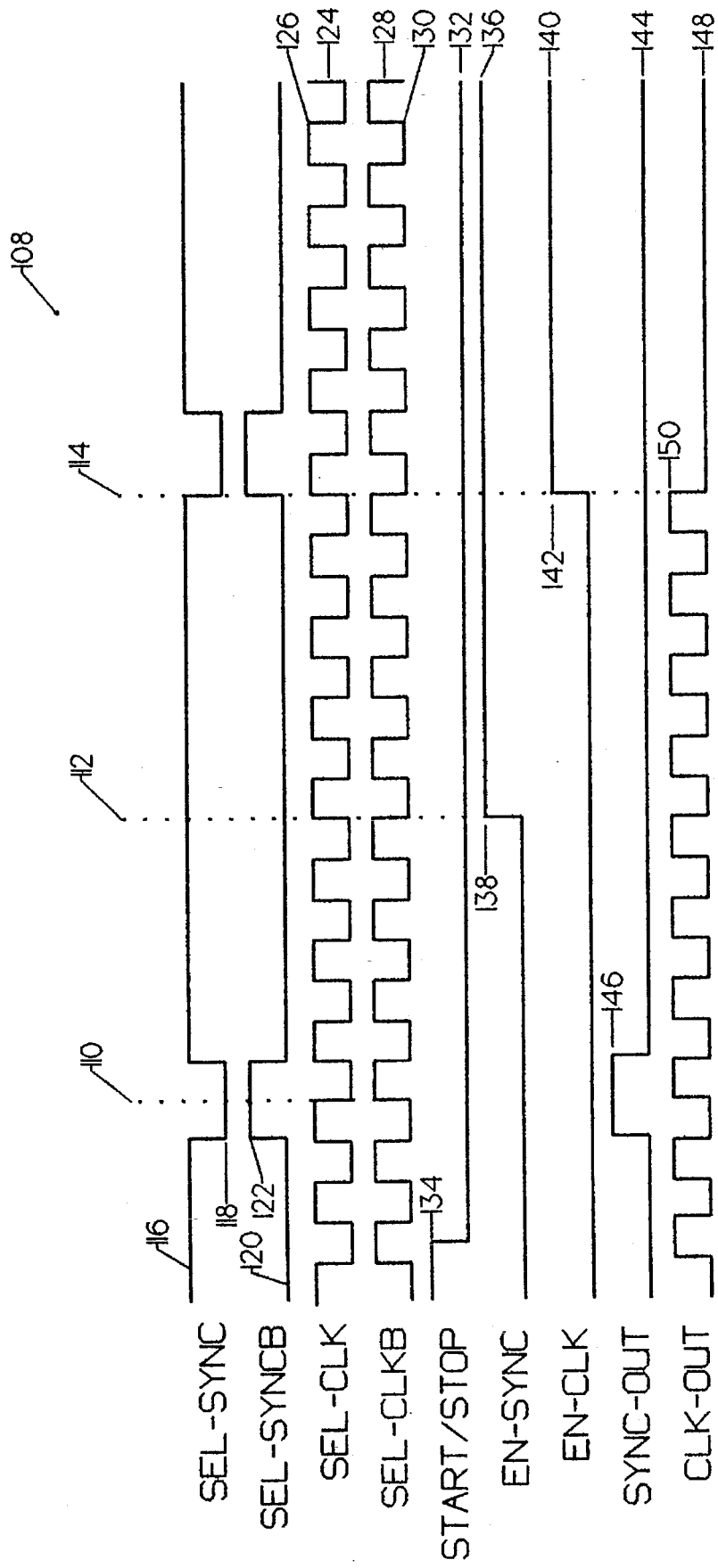
FIG. 4 is a timing diagram of the signals associated with stopping the current selected clock.

FIG. 4 is timing diagram 108 of the signals associated with stopping the currently selected clock in preparation for enabling a different one of the available clock sources. In the preferred mode this is a reliability measure associated with switching off a defective clock source in favor of an operable clock source. However, the same technique applies for switching between clock sources for other purposes, as explained above.

The general operation of the clock switching circuit involves first stopping the currently selected clock 36 and sync 34 signals from being provided to sync-out 38 and clk-out 40 (see also FIG. 1, 2 and 3). The next operation is to enable a different clock 36 and sync 34 signal pair by changing the values on the enable ports 32 (see also FIG. 1, 2 and 3). The final operation is to start the newly selected clock 36 and sync 34 signals and provide them to the sync-out 38 and clk-out 40 ports. Timing Diagram 108 only illustrates circuit operation for stopping the currently selected clock 36 and sync 34 signals. Timing Diagram 154 (see FIG. 5) shows circuit operation for starting the newly selected clock 36 and sync 34 signals.

Signal sel-sync 116 and sel-clk 124 are assumed to be the selected sync/clk pair via the enable ports 32. Therefore, sel-sync 116 will be passed directly to the Q output of 3:1 MUX 12 (see FIGS. 2 and 3). In addition, sel-clk 124 will be passed directly to the Q output of 3:1 MUX 14. Sel-syncb 120 represents the signal on the QB output port of 3:1 MUX 12 and sel-clkb 128 represents the signal on the QB output port of 3:1 MUX 14.

Start/stop 132 represents the signal on start/stop port 44. This signal goes to a logic low state to stop the current clock 36 and sync 34 signals. Conversely, start/stop 132 goes to a logic high logic level to start the next clock and sync signal as further described below.

En-sync 136 represents the signal on the QB output port of DFF 22. This signal is active low and therefore it enables the sync signal 34 to pass onto the sync-out output port 38 when it is in a logic low state. Similarly, en-clk 140 represents the signal on the QB output port of DFF 24. This signal is also active low and therefore enables the clk signal 36 to pass onto the clk-out output port 40 when it is in a logic low state.

Sync-out 144 and clk-out 148 represent the signals on the sync-out port 38 and clk-out 40, respectively. These signals are inverted from the sel-sync 116 and sel-clk 124 signals provided at the input ports of the circuit. The preferred embodiment of this circuit is inverting. However, a non-inverting circuit could easily be provided by adding inverters to the output signals or changing the logic within the design to a non-inverting equivalent.

The N-Bit Shift Register 16 receives signal sel-syncb 120 on the data-in port via line 50. The clock port of N-Bit Shift Register 16 receives the sel-clkb 128 signal via line 52. Therefore, at time 110, N-Bit Shift Register clocks in the value of pulse 122 of sel-syncb 120 into the first of the four D-type flip-flops. Three clock cycles later, the value of pulse 122 of sel-syncb 120 gets clocked into the fourth and last stage of N-Bit Shift Register 16 via line 96. At this point in time, the value of pulse 122 of sel-syncb 120 is available on the outputs of N-Bit Shift Register 16. Since the value of pulse 122 of sel-syncb 120 is a logic-1, there is now a logic-0 at the QB output port of N-bit Register 16. Therefore, the first port of and-gate 20 (which is coupled to the QB output of N-Bit Register 16) is enabled. Since the output of and-gate 20 is coupled to the clock port of DFF 22 via wire 64, DFF 22 will get a low to high clock edge at the next high to low transition of sel-clkb 128 via line 52. In addition, start/stop 132, which is coupled to the data-in port of DFF 22 via line 44, is a logic low. Therefore, DFF 22 will clock in a logic-0 at the next high to low transition of sel-clkb 128. This occurs at time 112 which is three and one-half clock cycles after time 110.

And-gate 28 was "enabled" prior to time 112 because DFF 22 contained a logical one and therefore the QB port of DFF 22 on line 46 was low, and this value was transmitted to and-gate 28 via wire 46. Since and-gate 28 has inverting inputs it follows that the sel-sync signal 42 was being inverted and reproduced on sync-out port 38 as shown by the sync-out signal 144. However, at time 112, DFF 22 clocks in a logical zero. This produces a logical one on the QB port of DFF 22 on line 46. This in turn disables and-gate 28 and forces signal sync-out 144 to remain in a zero state. The effect of en-sync 136 going high at time 112, however, is to continue to disable and-gate 28 thus holding sync-out 144 on line 38 to a zero state when sel-sync returns low on line 42 at time 114. Therefore, in the preferred embodiment, sync-out port 38 is disabled three and one-half clock cycles after time 110.

As stated earlier, the Q output of N-Bit Shift Register 16 is coupled to the data-in port of M-Bit Shift Register 18 via line 54. Therefore, M-Bit Shift Register 18 continues to shift the logical one previously shifted through N-Bit Shift Register 16. In the preferred embodiment M-Bit Shift Register 18 comprises four D-type flip flops and therefore requires four clock cycles to shift the data to the outputs of M-Bit Shift Register 18. Therefore, after a total of eight clock cycles (four clock cycles to shift the logical one through N-Bit Shift Register 16 and four clock cycles to shift the logical one through M-Bit Shift Register 18), the sel-syncb pulse 122 has been shifted to the Q and QB outputs of M-Bit Shift Register 18. Therefore, a half clock cycle before time 114, the Q output of M-Bit Shift Register 18 is at a logical one and the QB port of Shift Register 18 is at a logical zero. The first port of and-gate 68 (which is coupled to the QB output of M-Bit Register 18) is also enabled. Therefore, DFF 24 will get a clock edge at the next high to low transition of sel-clkb 128 via line 52. In addition, the data-in port of DFF 24 is coupled to the Q port of DFF 22 via line 56, which now is at a logic low level. Therefore, DFF 24 will clock in a logical zero at the next high to low transition of sel-clkb 128. This occurs at time 114.

And-gate 26 was enabled prior to time 114 because DFF 24 contained a logical one and therefore the QB port of DFF 24 was low and this value was transmitted to and-gate 26 via wire 62. Since and-gate 26 has inverting inputs it follows that the sel-clk signal 126 was being inverted and reproduced on clk-out port 40 as shown by the clk-out signal 148. However, at time 114, DFF 24 clocks in a logical zero. This produces a logical one on the QB port of DFF 24. This in turn disables and-gate 26 and forces signal clk-out 144 to a zero state. Therefore, in the preferred embodiment, the clk-out port 40 becomes disabled and set to zero a total of seven and one half clock cycles after time 110.

Figure 5:
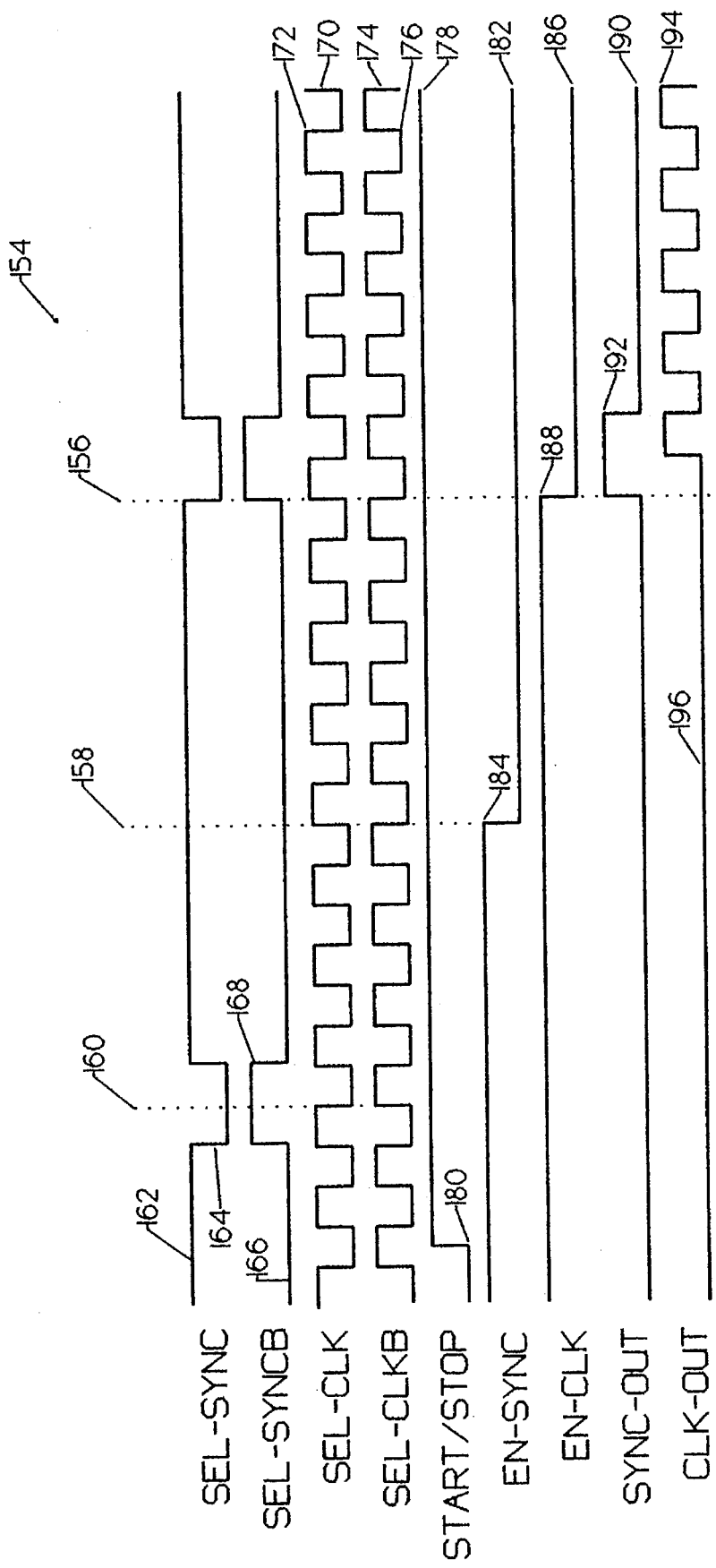
FIG. 5 is a timing diagram of the signals associated with starting the next selected clock.

FIG. 5 is timing diagram 154 of the signals associated with starting the next selected clock. Timing Diagram 154 shows circuit operation for starting the newly selected clock and sync signals. Timing Diagram 108 (see also FIG. 4) specifies circuit operation for stopping the currently selected clock and sync signals.

Figure 6:
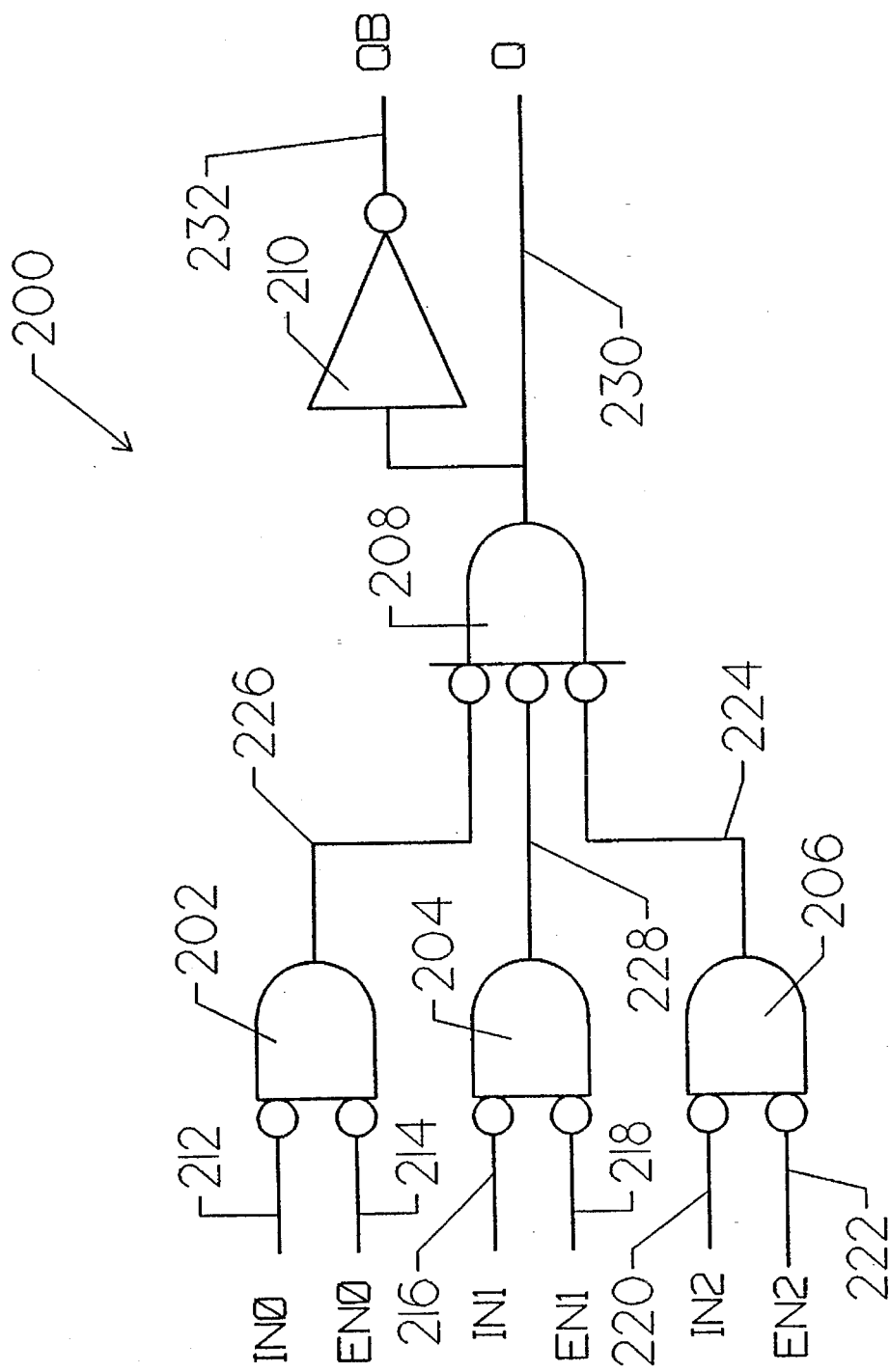
FIG. 6 is a detailed block diagram of the preferred embodiment of the three to one multiplexer circuit.

Signals sel-sync 162 and sel-clk 170 are assumed to be the newly selected sync/clk pair via the enable ports 32 (see FIG. 1, 2, and 3), Therefore, sel-sync 162 will be passed directly to the Q output of 3:1 MUX 12 (see FIG. 2, 3 or 6). In addition, sel-clk 170 will be passed directly to the Q output of 3:1 MUX 14 (see FIG. 2, 3 or 6). The signal sel-syncb 166 represents the signal on the QB output port of 3:1 MUX 12 on line 50, and sel/clkb 176 represents the signal on the QB output port of 3:1 MUX 14 on line 52(see FIG. 2 or 3).

Start/stop 178 represents the signal on the start/stop port 44 (see FIG. 1, 2, or 3). Note that this signal goes to a logic high state to start the newly selected clock and sync signals. Conversely, start/stop goes to a logic low level to stop the current clock signal (see FIG. 4), En-sync 182 represents the signal on the QB output port of DFF 22 on line 46 (see FIG. 2 or 3). This signal is active low and therefore enables the sync signal via line 42 to pass onto the sync-out output port 38 when it is in a logic low state. Similarly, en-clk 186 represents the signal on the QB output port of DFF 24 on line 62 (see FIG. 2 or 3). This signal is also active low and therefore enables the clk signal via line 48 to pass onto the clk-out output port 40 when it is in a logic low state.

Sync-out 190 and clk-out 196 represent the signals on sync-out port 38 and clk-out 40, respectively (see FIG. 2 or 3). Note that these signals are inverted from sel-sync 162 and sel-clk 170 signals provided at the input ports of the circuit. Therefore the preferred embodiment of this circuit is inverting. However, a non-inverting circuit could easily be provided by adding inverters to the output signals or changing the logic within the design to a demorgan equivalent of the same.

The operation of the circuit is as follows: The N-Bit Shift Register 16 receives signal sel-syncb 166 on it's data-in port via wire 50. The clk port of N-Bit Shift Register 16 receives the sel-clkb 174 signal via wire 52. Therefore, at time 160, N-Bit Shift Register 16 clocks in pulse 168 of sel-syncb 166 into the first of the four D-type flip flops (for the preferred embodiment in FIG. 3). Three clock cycles later, the value of pulse 168 of sel-syncb 166 gets shifted into the fourth and last stage of N-Bit Shift Register 16. At this point in time, the value of pulse 168 of sel-syncb 166 is available on the outputs of N-Bit Shift Register 16. Since the value of pulse 168 of sel-syncb 166 is a logic-1, there is now a logic-0 at the QB output port of N-bit Register 16. Therefore, the first port of and-gate 20 (which is coupled to the QB output of N-Bit Register 16) is enabled. Since the output of and-gate 20 is coupled to the clk port of DFF 22 via wire 64, DFF 22 will get a clock edge at the next high to low transition of sel-clkb 174 via line 52. In addition, start/stop 178, which is coupled to the data-in port of DFF 22, is a logic high. Therefore, DFF 22 will clock in a logic-1 at the next high to low transition of sel-clkb 174. This occurs at time 158 which is three and one-half clock cycles after time 160.

And-gate 28 was "disabled" prior to time 158 because DFF 22 contained a logic-0 and therefore the QB port of DFF 22 was high and this value was transmitted to and-gate 28 via wire 46. Therefore, sel-sync signal 166 was not allowed to pass through and-gate 28 and thus sync-out port 38 was being held low. However, at time 158, DFF 22 clocks in a logic-1. This produces a logic-0 on the QB port of DFF 22 which is delivered to and-gate 28 via wire 46. This in turn enabled and-gate 28 and allows sel/sync to pass through and-gate 28 and exit on sync-out port 38. Therefore, in the preferred embodiment, sync-out port 38 is enabled three and one-half clock cycles after time 160.

As stated earlier, the Q output of N-Bit Shift Register 16 is coupled to the data-in port of M-Bit Shift Register 18. Therefore, M-Bit Shift Register 18 continues to shift the logic-1 previously shifted through N-Bit Shift Register 16. In the preferred embodiment M-Bit Shift Register 18 comprises four D-type flip flops and therefore requires four clock cycles to shift the data to the outputs of M-Bit Shift Register 18. Therefore, after a total of eight clock cycles (four clock cycles to shift the logic-1 through N-Bit Shift Register 16 and four clock cycles to shift the logic-1 through M-Bit Shift Register 18), the value of the sel-syncb pulse 168 has been shifted to the Q and QB outputs of M-Bit Shift Register 18. Therefore a half clock cycle before time 156, the Q output of M-Bit Shift Register 18 is at a logic-1 and the QB port of Shift Register 18 is at a logic-0. The first port of and-gate 68 (which is coupled to the QB output of M-Bit Register 18) is also enabled. Therefore, DFF 24 will get a clock edge at the next high to low transition of sel-clkb 174. In addition, the data-in port of DFF 24 is coupled to the Q port of DFF 22, which now contains a logic high. Therefore, DFF 24 will clock in a logic-1 at the next high to low transition of sel-clkb 174. This occurs at time 156.

And-gate 26 was disabled prior to time 156 because DFF 24 contained a logic-0 and therefore the QB port of DFF 24 was high and this value was transmitted to and-gate 26 via wire 62. Since and-gate 26 has inverting inputs it follows that the sel-clk signal 174 was not being allowed to pass to clk-out 40. However, at time 156, DFF 24 clocks in a logic-1. This produces a logic-0 on the QB port of DFF 24 which is delivered to and-gate 26 via wire 62. This in turn enables and-gate 26 and allows sel-clk 174 via wire 48 to be inverted and reproduced on clk-out port 40 as shown by the clk-out signal 196. Therefore, in the preferred embodiment, the clk-out port 40 becomes enabled a total of seven and one half clock cycles after time 160.

FIG. 6 is detailed block diagram of the preferred embodiment of the three to one multiplexer circuit (3:1 MUX). The preferred embodiment of 3:1 MUX 200 comprises and gates with inverting inputs. Once skilled in the art would recognize that the function of this circuit can be implemented in many ways and therefore the present invention is not limited to the described embodiment. The input ports of and-gate 202 are coupled to input ports in0 212 and en0 214. The input ports of and-gate 204 are coupled to input ports in1 216 and en1 218. The input ports of and-gate 206 are coupled to input ports in2 220 and en2 222. Only one of the enable ports 214, 218 and 222 is allowed to be in a low state at any given time. The one enable port that is low selects the corresponding input 212, 214 and 220 respectively and passes that signal to the output of 3:1 MUX 200.

The first input port of three input and-gate 208 is coupled to the output port of and-gate 202 via wire 226. The second input port of three input and-gate 208 is coupled to the output port of and-gate 204 via wire 228. The third input port of three-input and-gate 208 is coupled to the output port of and-gate 206 via wire 224. The input port of inverter 210 is coupled to output port of three input and-gate 208. The output of three-input and-gate 208 is also coupled to the Q output port 230 of 3:1 MUX 200. Finally the output port of inverter 210 is coupled to the QB output port 232 of 3:1 MUX 200.

Having thus described the preferred embodiments of the present invention, those of skill in the art will readily appreciate that the teachings found herein may be applied to other embodiments within the scope of the claims hereto attached.

We claim:

1. An apparatus for switching between a plurality of clock input signals wherein each of the plurality of clock input signals is imposed on a corresponding one of a plurality of clock input ports, comprising:

a. a plurality of sync input ports wherein each of the plurality of sync input ports has a corresponding one of a plurality of sync input signals imposed thereon;

b. a clock output port;

c. initiation means for initiating the selection of one of the plurality of clock input signals;

d. first selecting means coupled to the plurality of clock input ports and further coupled to said initiation means for selecting one of the plurality of clock input signals thereby resulting in a selected clock input signal;

e. second selecting means coupled to the plurality of sync input ports and further coupled to said initiation means for selecting one of the plurality of sync input signals thereby resulting in a selected sync input signal;

f. sensing means coupled to said second selecting means for sensing when a sync pulse occurs on the selected sync input signal;

g. counting means coupled to said sensing means for counting N clock cycles from the time the sync pulse is sensed by said sensing means, where N is an integer greater than or equal to one; and h. controlling means coupled to said counting means for controlling the clock output port.

2. An apparatus according to claim 1 wherein said initiation means comprises a start/stop input port.

3. An apparatus according to claim 1 wherein said first selecting means comprises a multiplexer.

4. An apparatus according to claim 1 wherein said second selecting means comprises a multiplexer.

5. An apparatus according to claim 1 wherein said sensing means further comprises a flip-flop having a Data input and a clock input wherein the Data input is coupled to the selected sync input signal and the clock input is coupled to the selected clock input signal.

6. An apparatus according to claim 1 wherein said counting means comprises a plurality of flip flops arranged in a shift register configuration.

7. An apparatus according to claim 1 wherein said controlling means comprises an AND gate having a first input and a second input wherein the first input is coupled to the first selecting means and the second input is coupled to the counting means.

8. An apparatus for switching between a primary clock and one of a plurality of secondary clocks and further switching between a primary sync signal and one of a plurality of secondary sync signals, the apparatus having a sync-out port and clock-out port, comprising:

a. a first selecting means coupled to the plurality of secondary sync signals and further coupled to the primary sync signal for selecting from the primary sync signal to one of the plurality of secondary sync signals;

b. a second selecting means coupled to the plurality of secondary clocks and further coupled to the primary clock for selecting from the primary clock to one of the plurality of secondary clocks;

c. a shift register comprising a plurality of flip-flops, said shift register having a first control output and a second control output wherein said first control output is coupled to a flip-flop closer to the front of said shift register than the second control output for creating a shifting pulse;

d. a first control flip-flop coupled to the first control output of said shift register and further coupled to a start/stop port for controlling the sync-out port; and e. a second control flip-flop coupled to the second control output of said shift register and further coupled to said first control flip-flop for controlling the clock-out port.

9. An apparatus for switching between a primary clock and one of a plurality of secondary clocks and further for switching between a primary sync signal and one of a plurality of secondary sync signals, the apparatus having a sync-out port and clock-out port, comprising:

a. a first selecting means coupled to the plurality of secondary sync signals and further coupled to the primary sync signal for selecting from the primary sync signal to one of the plurality of secondary sync signals;

b. a second selecting means coupled to the plurality of secondary clocks and further coupled to the primary clock for selecting from the primary clock to one of the plurality of secondary clocks;

c. a first shift register having a first Data input, a first CLOCK input, and a first output wherein the first Data input is coupled to said first selecting means and the first CLOCK input is coupled to said second selecting means for creating a shifting pulse;

d. a first AND gate with a first input and a second input wherein the first input is coupled to said first output of said first shift register and the second input is coupled to said second selecting means;

e. a first control flip-flop having a second Data input, a second CLOCK input, and a second output wherein the second Data input is coupled to a start/stop signal and the second CLOCK input is coupled to said first AND gate for controlling the sync-out port;

f. a second shift register having a third Data input, a third CLOCK input, and a third output wherein the third Data input is coupled to said first output of said first shift register and the third CLOCK input is coupled to said second selecting means for creating a shifting pulse;

g. a second AND gate with a third input and a fourth input wherein the third input is coupled to said third output of said second shift register and the fourth input is coupled to said second selecting means;

h. a second control flip-flop having a fourth Data input, a fourth CLOCK input, and a fourth output wherein the fourth Data input is coupled to said second output of said first control flip-flop and the fourth CLOCK input is coupled to said second AND gate for controlling the clock-out port;

i. a third AND gate with a fifth input and a sixth input wherein the fifth input is coupled to said second output of said first control flip-flop and the sixth input is coupled to said first selecting means for providing the output signal to the sync-out port; and j. a fourth AND gate with a seventh input and an eighth input wherein the seventh input is coupled to said fourth output of said second control flip-flop and the eighth input is coupled to said second selecting means for providing the output signal to the clock-out port.

10. An apparatus for switching between a primary clock and one of a plurality of secondary clocks, the apparatus having a plurality of sync input ports and a clock-out port, comprising:

a. a first selecting means coupled to said plurality of sync input ports for selecting one of a plurality of sync signals;

b. a second selecting means coupled to the plurality of secondary clocks and further coupled to the primary clock for selecting from the primary clock to one of the plurality of secondary clocks;

c. a shift register comprising a plurality of flip-flops having a first control output and a second control output therein said first control output is coupled to a flip-flop closer to the front of said shift register than the second control output for creating a shifting pulse;

d. a first control flip-flop coupled to the first control output of said shift register and further coupled to a start/stop port; and e. a second control flip-flop coupled to the second control output of said shift register and further coupled to said first control flip-flop for controlling the clock-out port.

11. An apparatus for switching between a primary clock and one of a plurality of secondary clocks, the apparatus having a plurality of sync input ports and a clock-out port comprising:

a. a first selecting means coupled to the plurality of sync input ports for selecting one of a plurality of sync signals;

b. a second selecting means coupled to the plurality of secondary clocks and further coupled to the primary clock for selecting from the primary clock to one of the plurality of secondary clocks;

c. a first shift register having a first Data input, a first CLOCK input, and a first output wherein the first Data input is coupled to said first selecting means and the first CLOCK input is coupled to said second selecting means for creating a shifting pulse;

d. a first AND gate with a first input and a second input wherein the first input is coupled to said first output of said first shift register and the second input is coupled to said second selecting means;

e. a first control flip-flop having a second Data input, a second CLOCK input, and a second output wherein the second Data input is coupled to a start/stop signal and the second CLOCK input is coupled to said first AND gate;

f. a second shift register having a third Data input, a third CLOCK input, and a third output wherein the third Data input is coupled to said first output of said first shift register and the third CLOCK input is coupled to said second selecting means for creating a shifting pulse;

g. a second AND gate with a third input and a fourth input wherein the third input is coupled to said third output of said second shift register and the fourth input is coupled to said second selecting means;

h. a second control flip-flop having a fourth Data input, a fourth CLOCK input, and a fourth output wherein the fourth Data input is coupled to said second output of said first control flip-flop and the fourth CLOCK input is coupled to said second AND gate for controlling the clock-out port; and j. a third AND gate with a fifth input and a sixth input wherein the fifth input is coupled to said fourth output of said second control flip-flop and the sixth input is coupled to said second selecting means for providing the output signal to the clock-out port.

12. A method for switching between a plurality of clock signals which are applied to a clock output and for switching between a plurality of sync signals which are applied to a sync output whereby the plurality of clock signals individually correspond to the plurality of sync signals comprising:

a. forcing a start/stop signal to an inactive state indicating that a clock switch is desired;
b. waiting for a sync pulse to occur on a presently selected sync signal;
c. waiting N clock cycles, where N is an integer greater than or equal to one;
c. disabling the sync output while the sync output is in a first predetermined state such that no glitch occurs on the sync output;
e. waiting M clock cycles, wherein M is an integer greater than or equal to one;
f. disabling the clock output while the clock output is in a second predetermined state such that no glitch occurs on the clock output;
g. selecting a new clock signal from one of the plurality of clock signals;
h. selecting a new sync signal from one of a plurality of sync signals such that the new sync signal corresponds to the new clock signal;
i. forcing the start/stop signal to an active state indicating that the new clock signal has been selected;
j. waiting for a sync pulse to occur on the new sync signal;
k. waiting N clock cycles where N is an integer greater than or equal to one;
l. enabling the sync output while the new sync signal is in the first predetermined state such that no glitch occurs on the sync output;
m. waiting M clock cycles, where M is an integer greater than or equal to one; and
n. enabling the clock output while the new clock signal is in the second predetermined state such that no glitch occurs on the clock output.

13. A method for switching between a plurality of clock signals which are applied to a clock output comprising:

a. forcing a start/stop signal to an inactive state indicating that a clock switch is desired;
b. waiting for a sync pulse to occur on a selected one of a plurality of sync signals Where each sync signal corresponds to one of the plurality of clock signals;
c. waiting N clock cycles, where N is an integer greater than or equal to one;
d. disabling the clock output while the clock output is in a first predetermined state such that no glitch occurs on the clock output;
e. selecting a new clock signal from one of the plurality of clock signals;
f. selecting a new sync signal from one of the plurality of sync signals;
g. forcing the start/stop signal to an active state indicating that the new clock signal has been selected;
h. waiting for a sync pulse to occur on the new sync signal;
i. waiting N clock cycles, where N is an integer greater than or equal to one; and
j. enabling the clock output while the new clock signal is in the first predetermined state such that no glitch occurs on the clock output.

14. An apparatus for switching between a plurality of clock input signals wherein each of the plurality of clock input signals is imposed on a corresponding one of a plurality of clock input ports, comprising:

a. a plurality of sync input ports wherein predetermined ones of the plurality of sync input ports have a corresponding one of a plurality of sync input signals imposed thereon;
b. a clock output port;
c. initiation means for initiating the selection of one of the plurality of clock input signals:
d. selecting means coupled to the plurality of clock input ports, said plurality of sync input ports, and said initiation means, for selecting one of the plurality of clock input signals thereby resulting in a selected clock input signal, and for selecting one of the plurality of sync input signals thereby resulting in a selected sync input signal;
e. sensing means coupled to said selecting means for sensing when a sync pulse occurs on the selected sync input signal;
f. delaying means coupled to said sensing means for providing a delay of N clock cycles from the time the sync pulse is sensed by said sensing means, where N is an integer greater than or equal to one; and
g. controlling means coupled to said delaying means for controlling the clock output port.

* * * * *

UNITED STATES PATENT AND TRADEMARK OFFICE
CERTIFICATE OF CORRECTION

PATENT NO. : 5,574,753
DATED      : Nov. 12, 1996
INVENTOR(S) : Vartti et al.

It is certified that error appears in the above-identified patent and that said Letters Patent is hereby corrected as shown below:

Col. 12, line 12, delete "therein", and insert in its place --wherein--.

Col. 13, line 46, delete "Where", and insert in its place --where--.

Signed and Sealed this

Twenty-eighth Day of January, 1997

Attest:

BRUCE LEHMAN

Attesting Officer   Commissioner of Patents and Trademarks